(12) United States Patent
Aldrich

(10) Patent No.: US 9,004,423 B2
(45) Date of Patent: Apr. 14, 2015

(54) FENCE POST PLATFORM ATTACHMENT DEVICE

(71) Applicant: Charles Aldrich, Clarion, IA (US)

(72) Inventor: Charles Aldrich, Clarion, IA (US)

( * ) Notice: Subject to any disclaimer, the term of this patent is extended or adjusted under 35 U.S.C. 154(b) by 0 days.

(21) Appl. No.: 13/831,628

(22) Filed: Mar. 15, 2013

(65) Prior Publication Data

US 2014/0263898 A1    Sep. 18, 2014

(51) Int. Cl.
| | | |
|---|---|---|
| *E04H 17/00* | (2006.01) | |
| *A01G 25/00* | (2006.01) | |
| *A01K 31/14* | (2006.01) | |
| *E01F 9/00* | (2006.01) | |
| *E04H 17/20* | (2006.01) | |
| *E04H 12/22* | (2006.01) | |
| *E04H 17/14* | (2006.01) | |

(52) U.S. Cl.
CPC ............ *E04H 17/00* (2013.01); *E04H 12/2253* (2013.01); *E04H 17/1413* (2013.01); *E04H 2017/1456* (2013.01); *A01G 25/00* (2013.01); *A01K 31/14* (2013.01); *E01F 9/00* (2013.01); *E04H 17/20* (2013.01); *E04H 2017/006* (2013.01)

(58) Field of Classification Search
CPC ............... E04H 17/1413; E04H 17/20; E04H 2017/1456; E04H 12/2253; A47G 29/1216; F16B 9/02; Y10S 256/05
USPC ............. 248/346.01, 121, 156, 188.1, 219.2, 248/519, 523, 159, 545; 52/126.6, 167.8, 52/263, 238.1, 301; 256/1, 65.01, 65.02, 256/65.03, 65.14, 19, 21, 32; 108/64, 108/157.16, 59, 157.1
See application file for complete search history.

(56) References Cited

U.S. PATENT DOCUMENTS

| | | | | |
|---|---|---|---|---|
| 383,343 | A * | 5/1888 | Coker | 256/21 |
| 4,901,490 | A * | 2/1990 | Zinniel et al. | 52/263 |
| 5,363,610 | A * | 11/1994 | Thomas et al. | 52/167.8 |
| 5,860,636 | A * | 1/1999 | Duncan et al. | 256/1 |
| 6,047,648 | A * | 4/2000 | Alm et al. | 108/157.16 |
| 6,508,457 | B1 * | 1/2003 | Knudson et al. | 256/65.01 |
| 6,691,479 | B1 * | 2/2004 | Tscharner | 52/301 |
| 8,104,732 | B1 * | 1/2012 | Robinson et al. | 248/346.01 |
| 8,528,282 | B1 * | 9/2013 | Hemphill et al. | 52/238.1 |
| 8,646,735 | B2 * | 2/2014 | Bradley | 248/121 |
| 2005/0127259 | A1 * | 6/2005 | Riker | 248/219.2 |

* cited by examiner

*Primary Examiner* — Tan Le
(74) *Attorney, Agent, or Firm* — Mark David Torche; Patwrite LLC

(57) ABSTRACT

A fence post platform attachment device fits on top of a T-post has a top platform portion that allows objects such as birdhouses, signs, sprinklers, lockboxes, etc. to be secured to the T-post. A cross-shaped body portion is formed by bending a sheet of steel into a hollow cross shape and welding it to the top platform portion. A series of holes are disposed along the corners of the top platform portion to allow a user to attach the desired object. Fasteners such as bolts securely hold the selected objet to the top platform portion thereby securing it to the T-post fence post.

3 Claims, 7 Drawing Sheets

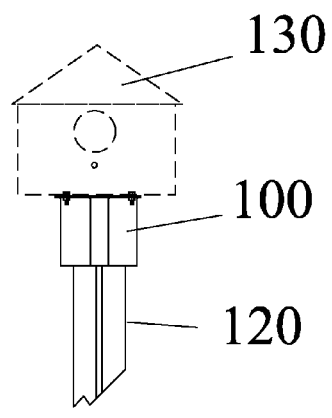
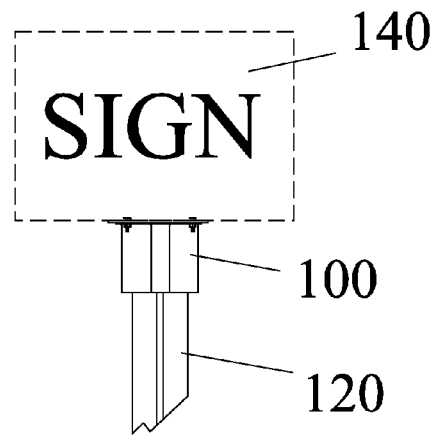
FIG. 7   FIG. 8
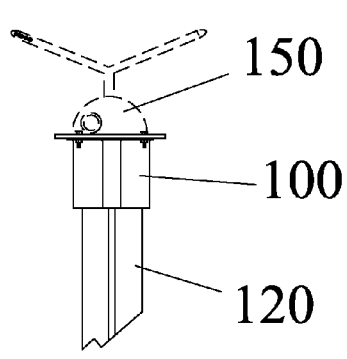
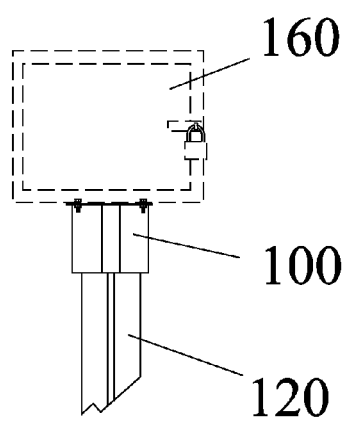
FIG. 9   FIG. 10

FENCE POST PLATFORM ATTACHMENT DEVICE

BACKGROUND OF THE INVENTION

Historically, fences were generally built to keep animals and people out of an area. Today, agricultural fences keep animals contained and some fences serve both purposes such as the fences that surround prisons. Most early fences were built of materials close at hand such as stones or trees and even dirt.

Wooden fences also allowed a user to attach things or rest things on top of the post. All kinds of things can be attached to the top of a wooden fence post such as a bird houses which could easily be attached to the top of the post using nails or screws. While this may be desirable, installing wooden fence post is quite labor intensive since it generally requires digging a hole and filling it with concrete to make it secure. Metal fence posts are much easier to install and are generally just pounded into the ground; however, it is very difficult to attach anything to the top of them. Often people attempt to attach things by using wire, but it is not easy to provide a secure platform for the attached items.

A common form of metal fence posts are known as T-posts. They are usually pounded into the ground with the fencing material pulled tightly between adjacent posts. While these fence posts work well and are relatively easy to install compared to wooden fence post, once installed they are not very useful to attach other objects to their top portion. There is a need for a method of attaching things to a T-post that preserves the ease of installation of a metal post while allowing secure attachment to its top portion.

SUMMARY OF THE INVENTION

A fence post platform attachment device fits on top of a T-post has a top platform portion that allows objects such as birdhouses, signs, sprinklers, lockboxes, etc. to be secured to the T-post. A cross-shaped body portion is formed by bending a sheet of steel into a hollow cross shape and welding it to the top platform portion. A series of holes are disposed along the corners of the top platform portion to allow a user to attach the desired object. Fasteners such as bolts securely hold the selected objet to the top platform portion thereby securing it to the T-post fence post.

Other features and advantages of the instant invention will become apparent from the following description of the invention which refers to the accompanying drawings.

BRIEF DESCRIPTION OF THE DRAWINGS

FIG. 7 is a side view of the T-post platform attachment device shown mounted on top of a T-post with a bird house attached.

FIG. 8 is a side view of the T-post platform attachment device shown mounted on top of a T-post with a sign attached.

FIG. 9 is a side view of the T-post platform attachment device shown mounted on top of a T-post with a sprinkler attached.

FIG. 10 is a side view of the T-post platform attachment device shown mounted on top of a T-post with a lock box attached.

DETAILED DESCRIPTION OF THE INVENTION

Figure 1:
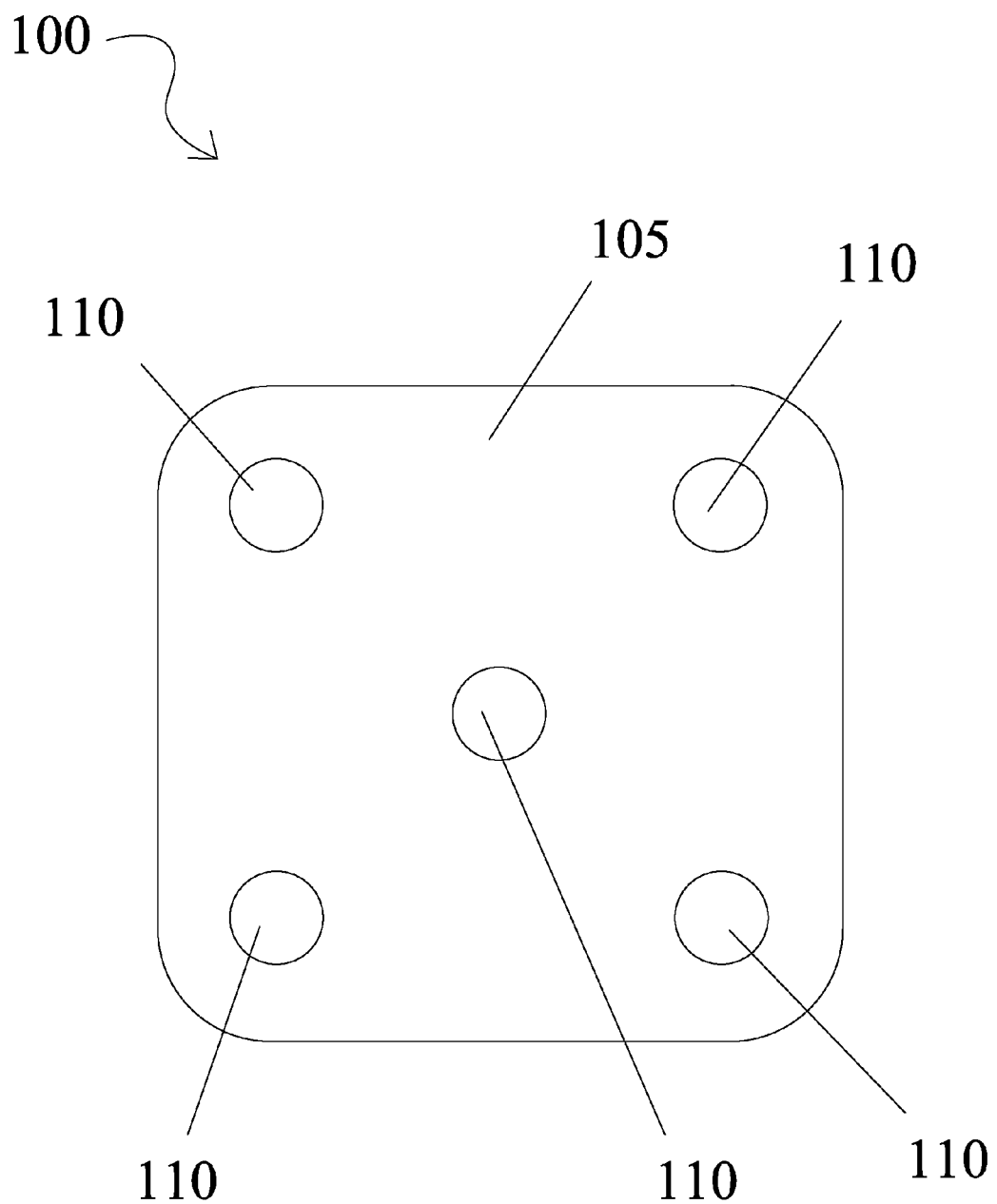
FIG. 1 is a top view a T-post platform attachment device according to an embodiment of the invention.
Figure 2:
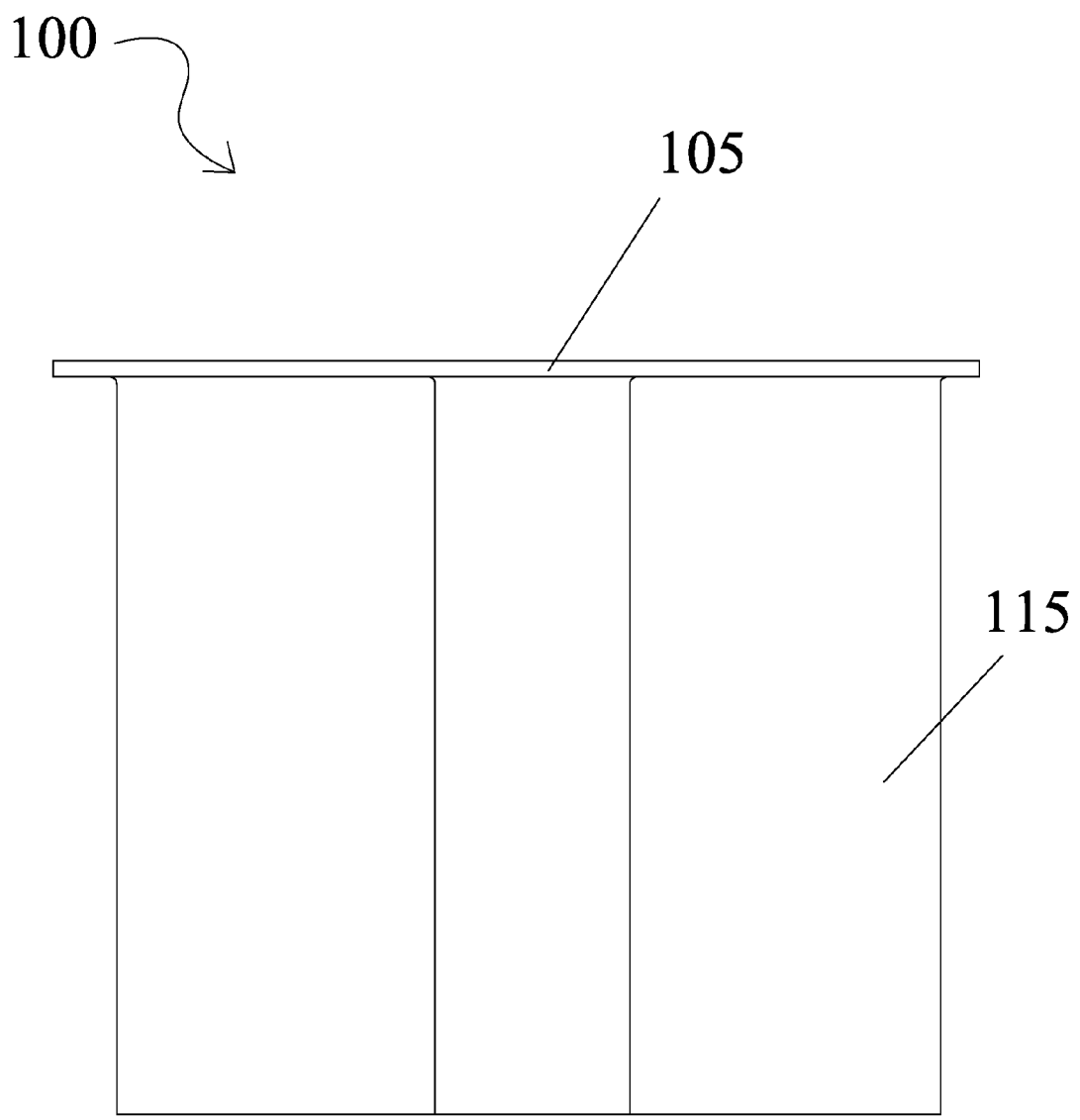
FIG. 2 is a side view of the T-post platform attachment device shown in FIG. 1.
Figure 3:
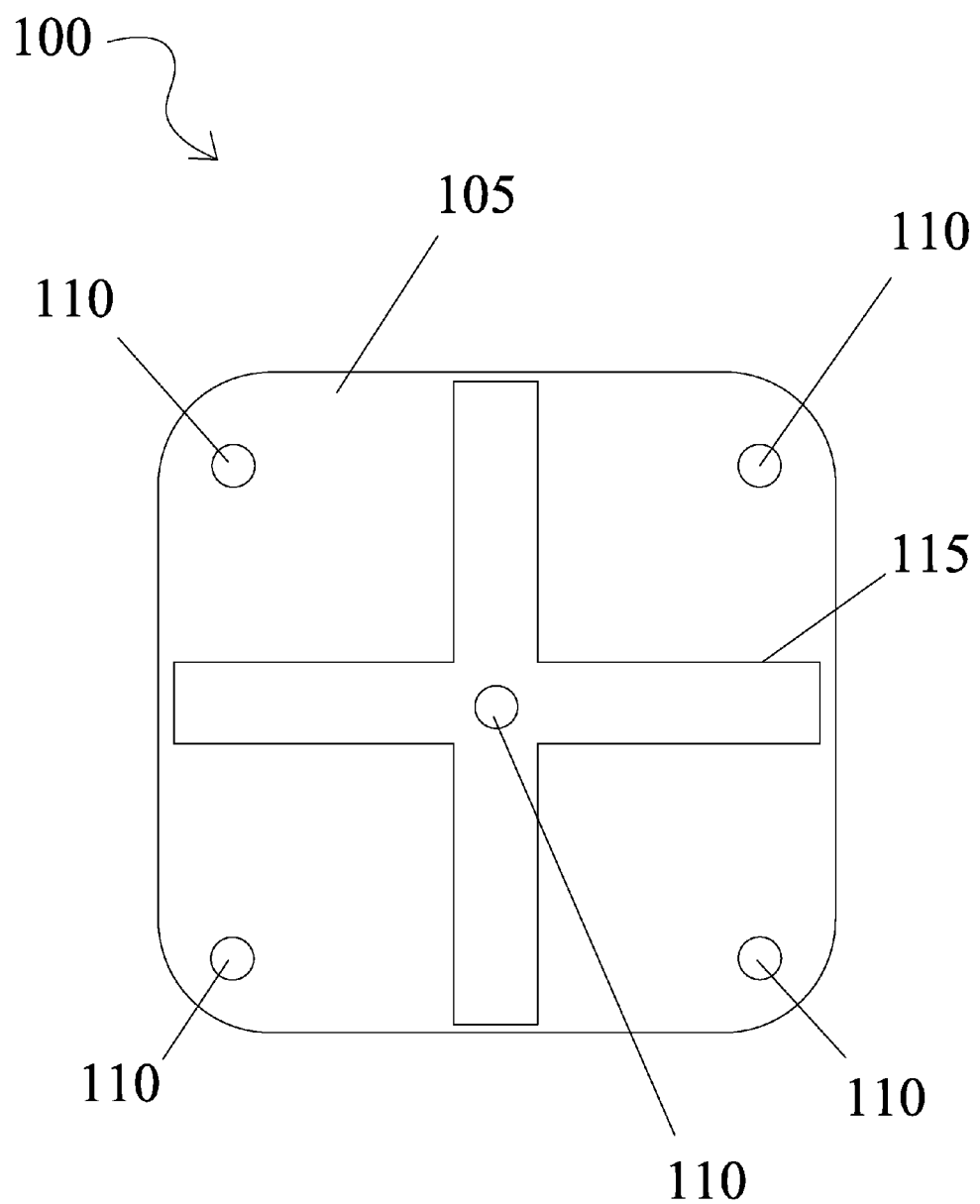
FIG. 3 is a bottom view of the T-post platform attachment device shown in FIG. 1.
Figure 4:
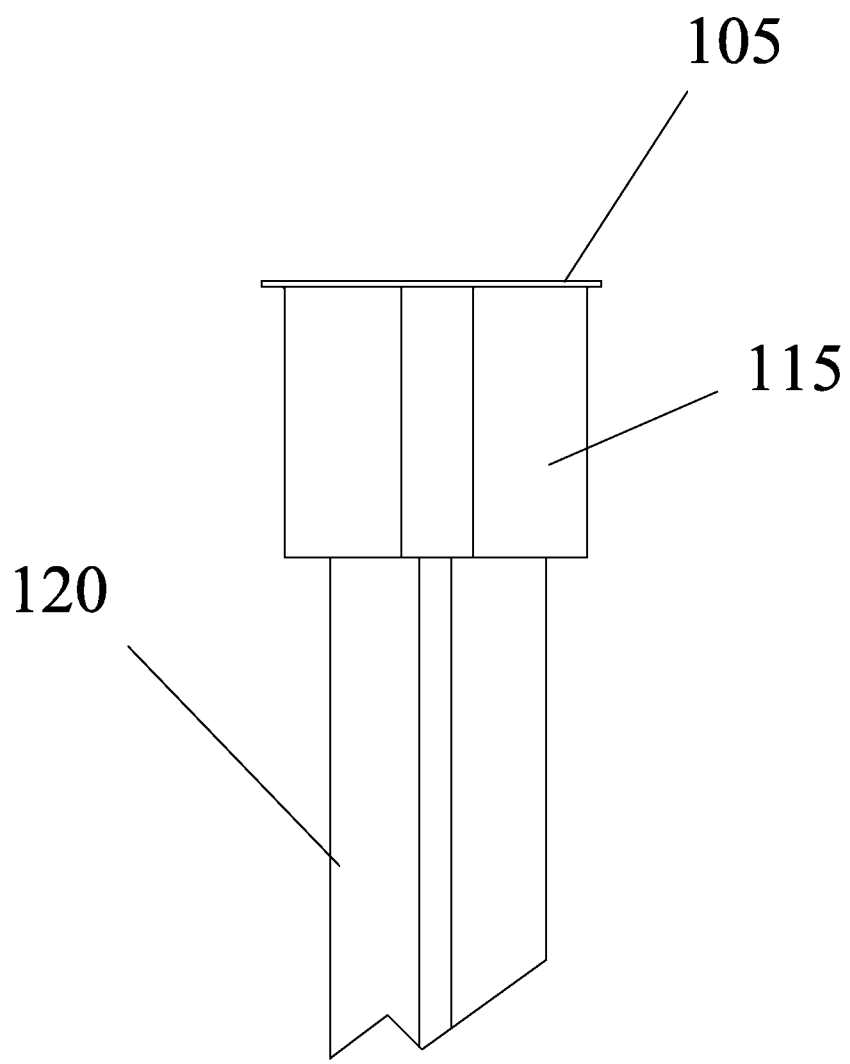
FIG. 4 is a side view of the T-post platform attachment device shown mounted on top of a T-post.
Figure 5:
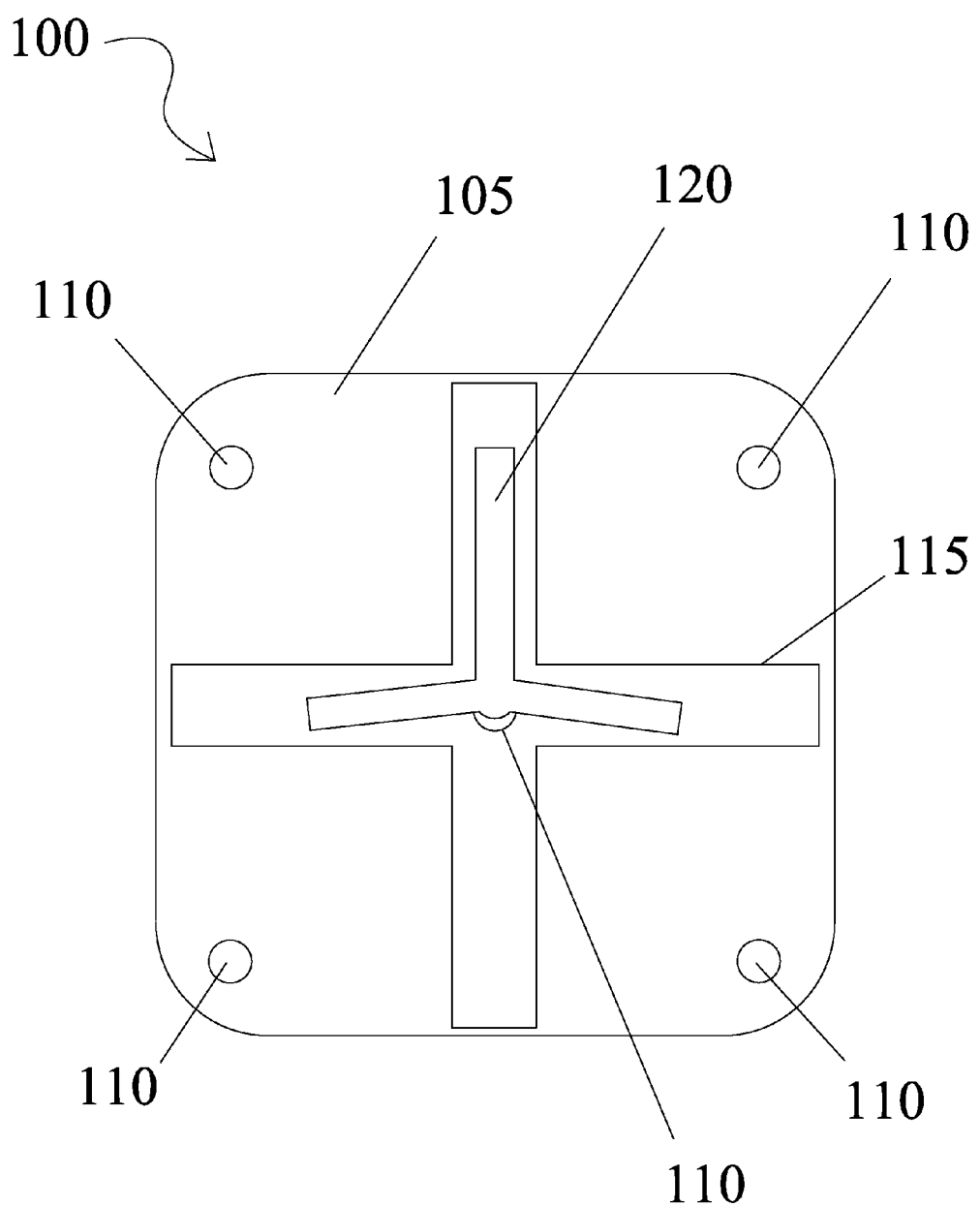
FIG. 5 is a bottom view of the T-post platform attachment device shown in FIG. 1 with a T-post inserted therein.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIGS. 1-4, a T-post platform attachment device 100 is shown a top attachment plate portion 105 welded to a body portion 115. Of course, other methods of joining top attachment plate portion 105 to body portion 115 may be used such as, but not limited to molding or punch pressing out of a single piece of material as long as the top is securely joined to the body. Top attachment plate portion 105 is generally square. T-post platform attachment device 100 is made of steel, but can be made of aluminum or other material depending on the application. Plastic may be appropriate for some applications. In manufacturing T-post platform attachment device 100, top attachment plate portion is cut from sheet steel. The steel is from 1/16 inch to 1/8 depending on the application with the thicker steel providing more rigidity. Of course other thicknesses could be used if a particular application required it.

Body portion 115 is formed from a sheet of steel and bent by folding in a series of ninety degree bends to form the cross shape longitudinally extending portion that fits over a T-post and keeps it from spinning or turning and providing a secure platform to attach items.

Top attachment plate portion 115 has a plurality of holes 110 used to attach various items. T-post platform attachment device 100 fits on top of a T-post 120. The shape of body portion 115 is cross-like but of sufficient width to accommodate a variety of different size T-posts. T-post 120 fits within the channels formed by the "T-shaped" body portion 115. Of course other shaped fence posts will also fit such as L-shaped posts or cross-shaped posts and others.

Figure 6:
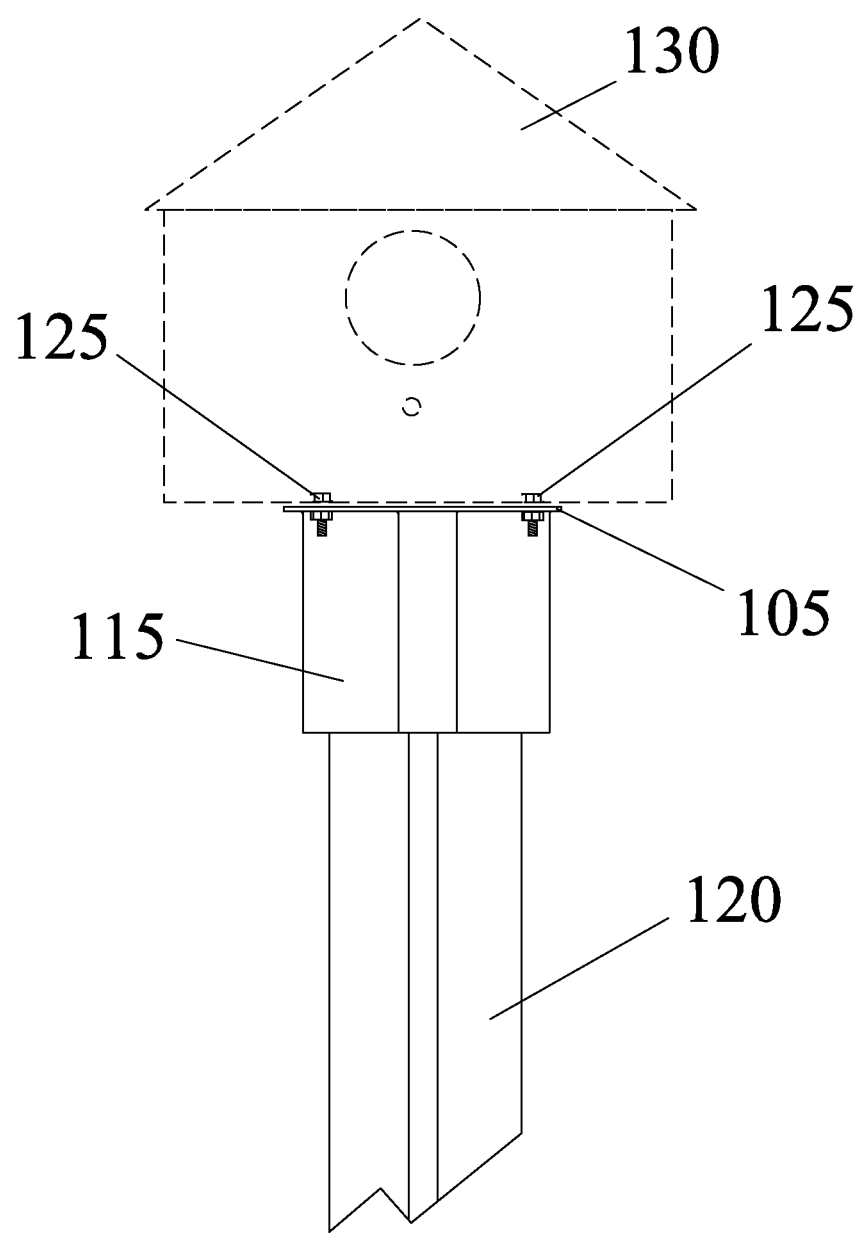
FIG. 6 is a side view of the T-post platform attachment device shown mounted on top of a T-post with a bird house attached.

Now referring to FIG. 6, T-post platform attachment device 100 is shown secured to the top of T-post 120. In the embodiment shown, a bird house 130 is secured to top attachment plate 105 using bolts 125. Of course other fastening means may be used such as rivets, pins or other suitable securing means.

Referring now to FIGS. 7-10, a variety of items that can be attached to a fence post using T-post platform attachment device 100 is shown with bird house 130, a sign 140, a sprinkler 150 and a lock-box 160. Of course these items are only meant to be illustrative of the kind of things that can be attached to the top of a T-post and is not exhaustive. Many other items can be attached.

Although the instant invention has been described in relation to particular embodiments thereof, many other variations and modifications and other uses will become apparent to those skilled in the art.

What is claimed is:

1. A fence post platform attachment device that fits on top of a T-post comprises:

a generally square planar platform top portion;

said platform top portion having a plurality of attachment holes disposed therein;

a platform body attached to said planar platform top portion;

said platform body having a cross-shaped opening adapted to fit over the top portion of said T-post; each leg of said cross-shaped opening being of equal length whereby said cross-shaped opening is selectively positionable in one of four possible orientations over said T-post; and said cross-shaped opening forming a contained hollow space having a length generally the same as said planar top portion wherein said contained hollow space is open only on a bottom portion therein.

2. The fence post platform attachment device that fits on top of a T-post according to claim 1 wherein said plurality of attachment holes are placed at the four corners of said platform top portion.

3. The fence post platform attachment device that fits on top of a T-post according to claim 2 further comprising an attachment hole disposed in the center of said platform top portion.

* * * * *